United States Patent [19]
Pritchard

[11] Patent Number: 5,913,285
[45] Date of Patent: Jun. 22, 1999

[54] NON-CHOKING PET RESTRAINT

[76] Inventor: Kimberly M. Pritchard, 2325 Ada, Pocatello, Id. 83201

[21] Appl. No.: 09/162,392
[22] Filed: Sep. 28, 1998
[51] Int. Cl.⁶ .................................................. B60R 22/00
[52] U.S. Cl. ......................... 119/771; 119/769; 119/770; 119/856; 119/907
[58] Field of Search .................................. 119/771, 774, 119/770, 792, 856, 857, 907

[56] References Cited

U.S. PATENT DOCUMENTS

| 438,182 | 11/1890 | Regan | 54/87 |
|---|---|---|---|
| 1,508,601 | 9/1924 | Huff | 119/792 |
| 2,826,172 | 3/1958 | Buckle et al. | 119/792 |
| 4,324,204 | 4/1982 | Friedman | 119/771 |
| 4,537,154 | 8/1985 | Kay | 119/857 |
| 4,715,618 | 12/1987 | Harris | 119/771 |
| 4,970,991 | 11/1990 | Luce | 119/771 |
| 4,973,278 | 11/1990 | Williams | 441/131 |
| 5,443,037 | 8/1995 | Saleme | 119/771 |
| 5,660,146 | 8/1997 | Sporn | 119/792 |
| 5,713,308 | 2/1998 | Holt, Jr. | 119/856 |
| 5,813,367 | 9/1998 | O'Brien | 119/770 |

OTHER PUBLICATIONS

Copy of Tag Re. Four Paws No–Pull Halter, a Product of Four Paws Products, Ltd., Hauppauge, NY (U.S. Patent 4,964,369).

Primary Examiner—Michael J. Carone
Assistant Examiner—Judith A. Nelson
Attorney, Agent, or Firm—Robert L. Shaver; Frank J. Dykas

[57] ABSTRACT

A non-choking pet restraint which applies restraining pressure to an animals shoulder's and chest and not to the neck and throat area. The device has a chest/belly panel, which also serves as a brush protective guard for dogs in the field, and two shoulder panels attached to it and to a back strap. Flank straps attach to the chest/belly panel, and to a back strap. A leach attachment ring is part of the back strap. The leash attachment ring rests on a dog behind his shoulder blades and rib cage, and in front of his hips. The device includes a convenient way to restrain a pet in a car seat using the car seat belt.

12 Claims, 8 Drawing Sheets

NON-CHOKING PET RESTRAINT

BACKGROUND OF THE INVENTION

1. Technical Field

This invention generally relates to pet harnesses, and more particularly to pet harnesses which restrain a pet without applying pressure to the animal's neck, thereby choking them.

2. Background

There are a wide variety of pet restraints which have been commonly available or which have been patented over the years. The simplest of these devices are collars which are buckled or tied around a dog's neck, and to which a leash is attached. Some of these collars are specifically designed to apply a choking pressure to a dog's neck when the leash is pulled. These are used in training to modify the dog's behavior. Other restraints have been designed specifically to provide for anchoring a dog to an automobile seat, so that the dog is safer in a crash than an unrestrained dog. Some harnesses have acknowledged the need to provide a pet restraint which does not bear down on the dog's sensitive neck area. Some harnesses have addressed this situation by providing devices which have straps under the dog's front legs, which apply pressure on the dog's front leg area when the leash is pulled back. Other leashes have a mechanism which squeezes the animal around the waist when the leash is pulled back. The problem with each of these devices is that it presents other problems. With a device which fits under the dog's under arm and pulls up on the front leg region, when a heavy and aggressive dog is restrained in this way, enough force is applied to his sensitive under arm area to damage ligaments located there. This is an undesirable side effect to be avoided. Gripping the dog around its midsection can also injure or strain the muscles of his underside, and cause the dog to vomit if enough pressure is placed there.

Other types of harnesses involve a strap which crosses itself in front of a dog's chest, goes down the center line of the dog's belly and attaches back to a leash loop more or less between the dog's shoulders. This type of harness is improved over some harnesses, but still has the effect of choking the dog when the dog is restrained. This is especially true when the dog drops its head down and forward, such as to eat or drink, or to follow a scent on the ground.

Another feature which is needed in pet restraints and which is not provided in the prior art is a device which protects field dogs from being injured by sticks, branches and rocks which they encounter when swiftly traveling through rocky and brushy terrain. Under these conditions, a stabbing type injury to the chest is not uncommon and can incapacitate a valuable hunting dog.

What is needed, then, is pet restraint harness for dogs and other pets by which a pet can be restrained without placing pressure on the pet's neck, and without placing acute pressure anywhere on the dog that would cause an injury, such as a muscle or a ligament injury.

Securing the dog while traveling in a car is also a needed feature of a pet restraint. Prior art pet harnesses either show a restraint loop at the neck, which could cause serious injury or death, or requires modification to the car, or involves complicated securing means. The pet restraint harness of the invention should thus also provide a convenient way to attach a dog to an automobile seat or to an automobile seat belt, so that the dog is safely restrained in case of a crash. This also serves to keep the dog immobile in the car for the convenience of the driver. This pet restraint should also provide a mechanism for protecting a dog which is used in the field from chest injuries from sticks, branches and rocks which it may encounter when in the field.

Accordingly, it is an object of the invention to provide a pet restraint harness which safely restrains a pet without applying acute pressure at any one point of the pet's body, especially its neck.

It is a further object of the invention that the pet restraint harness also provide physical protection to the dog's neck and chest area from obstacles encountered in the field, such as sticks and branches.

Another object of the invention is to provide a means for the pet to be safely anchored in an automobile using the pet restraint harness.

It is a further object of the invention that the pet restraint harness restrain the pet by applying pressure across areas of the body which can withstand acute pressure, and that the pressure be spread out over those areas to minimize the risk of injury and discomfort. The best place for receiving such force is over the dog's chest and shoulders, which is well below the sensitive throat area.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects and advantages are attained by a non-choking pet restraint which restrains pets without applying pressure to the throat or neck of a pet, such as a dog or cat. The non-choking pet restraint is formed from a chest and belly panel which also offers physical protection to a pet from the sticks, branches, thorns, and burrs which make up field brush, or from rocks which it may encounter in the field. This physical protection is provided by a fabric which is essentially field brush proof, that is, substantially resists penetration by those objects. The chest and belly panel has a front end and a rear end, and is attached at the front end to right and left shoulder panels. At its rear end the chest and belly panel has a right and left corner which are respectively attached to a right and left flank strap. The chest and belly panel is generally triangular in shape, with the right and left corners forming two corners of the triangle. The other corner of the triangle is the front end to which is attached the left and right shoulder panels.

The left and right shoulder panels are also generally triangular in shape and pass from the pet's chest area, across its shoulders, and towards its lower back region. On the pet's back region is located a back strap which can be a short piece of webbing material, to which is attached an end of both the right and the left shoulder panel. To the right and left corners of the chest and belly panel is attached a right and left flank strap. Each flank strap has a first and a second end, and is attached at its first end to the left and right corner of the chest and belly panel, and at its second end to the back strap. The right and left flank straps can be attached to the back strap by a number of means, but the use of a 3-way buckle is advantageous.

Located on the back strap is a restraint attachment ring, which serves as an attachment point for pet restraint devices, such as a leash, a line, a cable, or other restraint devices. The leash attachment ring and back strap are sized so that the leash attachment ring is located well behind the dog's shoulder blades. Also attached to the back strap is a loop of webbing through which an automobile seat belt can be passed. When attached to a seat belt in this manner, the pet is restrained in the case of a crash, and also immobilized for the convenience of the driver.

The left and right flank strap of the device can be adjustable in length, as can the left and right shoulder panels. The back strap can also be adjustable in length, for optimal positioning on the dog. An important feature of this device is that the leash or other restraining device attaches to the restraint attachment ring at a location well down the dog's back, such as behind the dog's shoulders, or even behind the dog's rib cage. The purpose of placing the point of attachment this far back is so that when restraining pressure is applied, the harness does not have a tendency to pull up from the dog's shoulders on to its neck. Instead it pulls directly across the dog's shoulders and across the front of its chest.

The back strap can also be adjustable so that the position of the 3-way buckle can be adjusted to properly fit a restraint device to different sizes of pets. The chest and belly panel of the device is made from a fabric which is resistant to penetration by the sticks, branches, thorns, and burrs of field brush, or field brush proof, and cannot be easily punctured by a stick, branch or rock that a dog runs into at full speed.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

DESCRIPTION OF THE PREFERRED EMBODIMENTS

Figure 1:
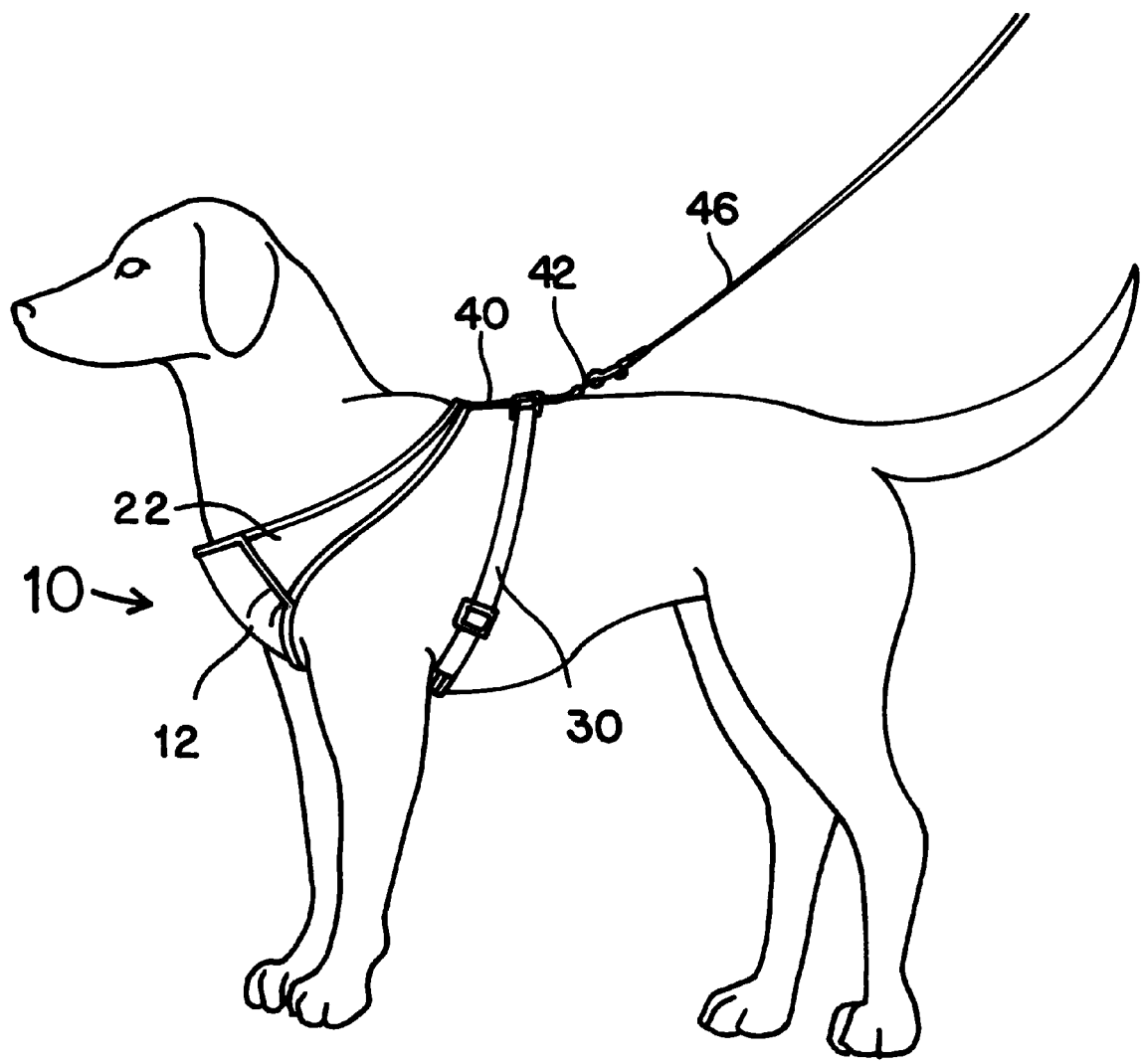
FIG. 1 is a perspective view of the non-choking pet restraint harness on a standing dog.
Figure 2:
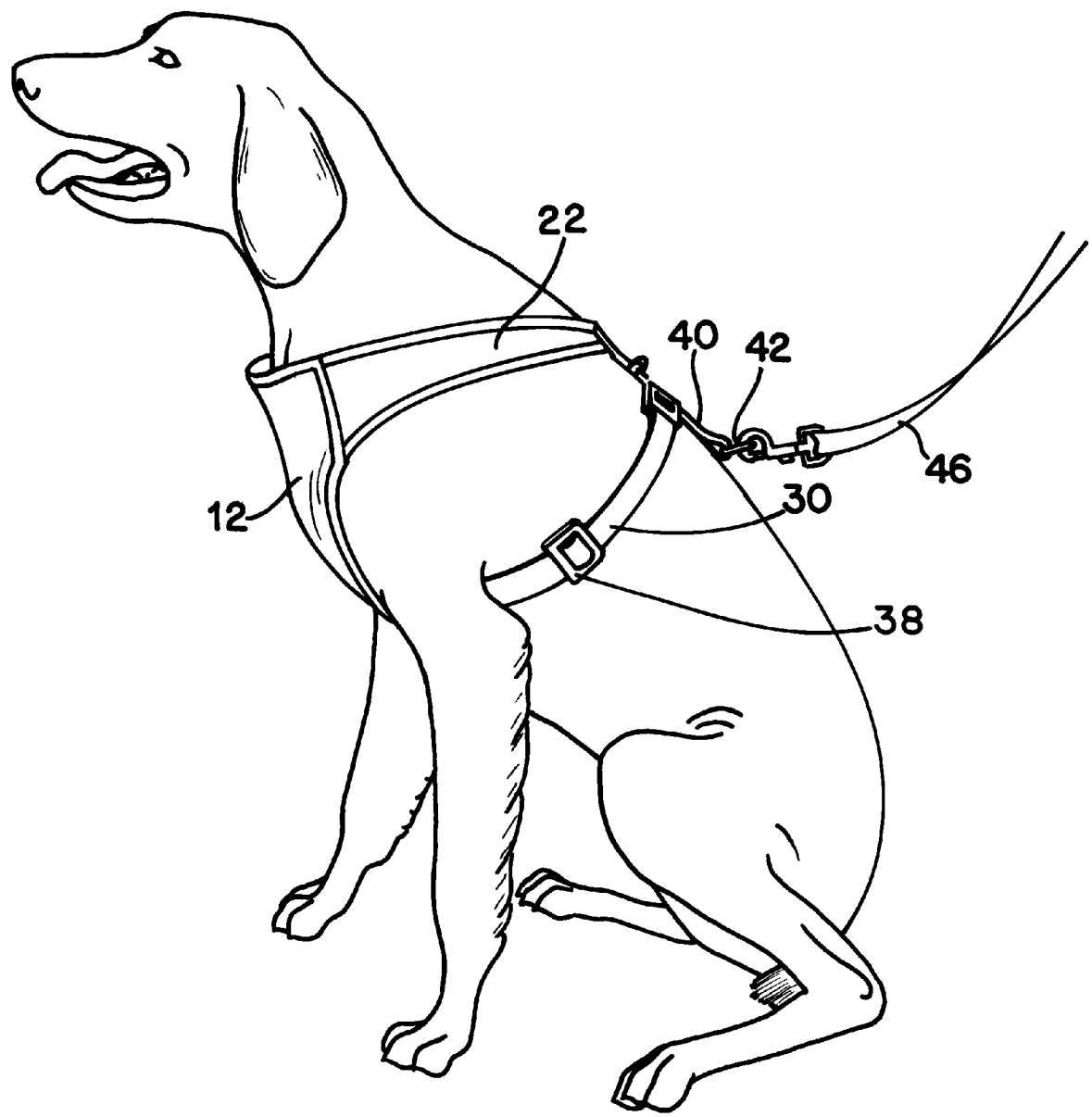
FIG. 2 is a perspective view of the non-choking pet restraint harness on a sitting dog.
Figure 4:
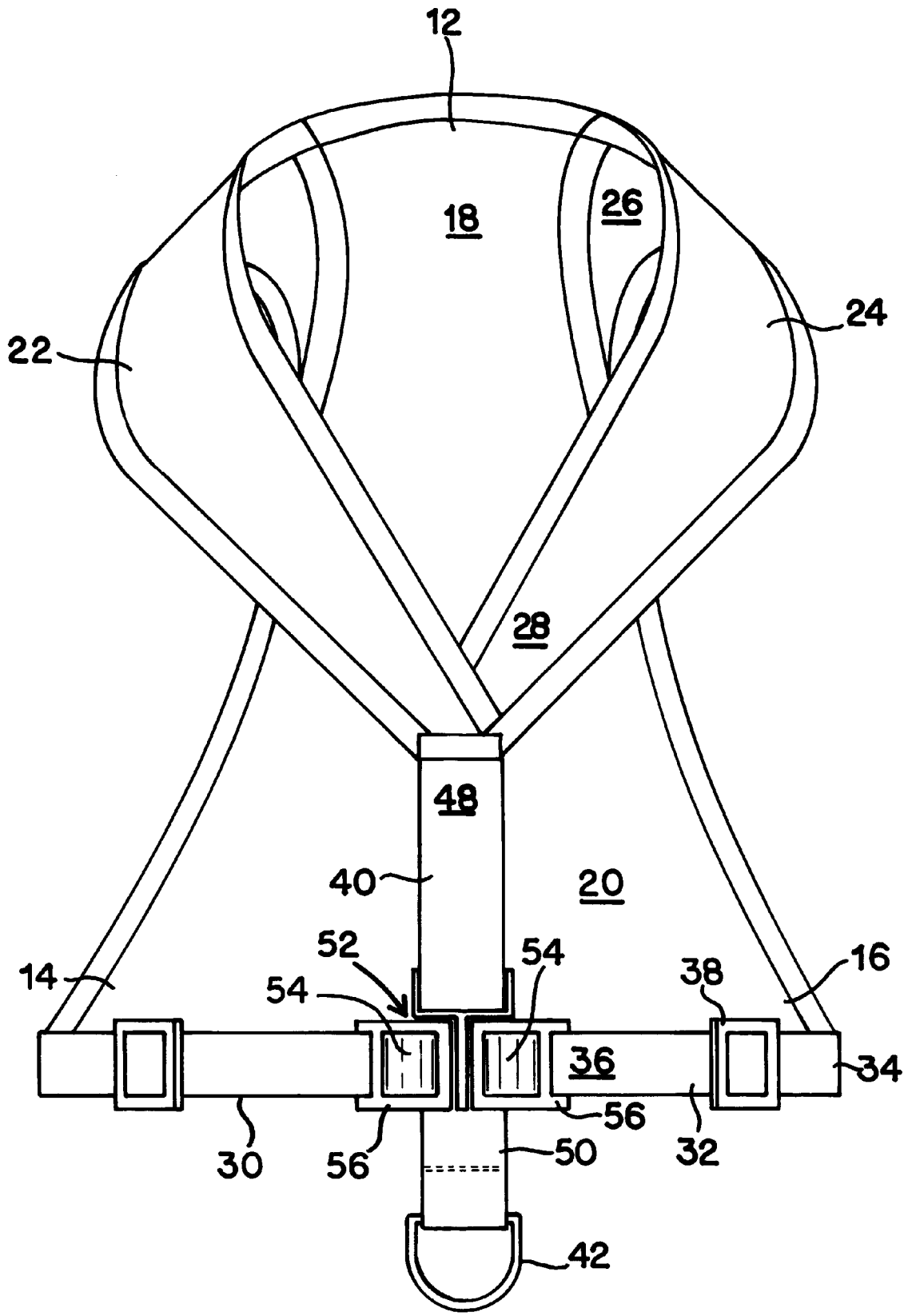
FIG. 4 is a top view of the non-choking pet restraint harness showing details of its construction.
Figure 5:
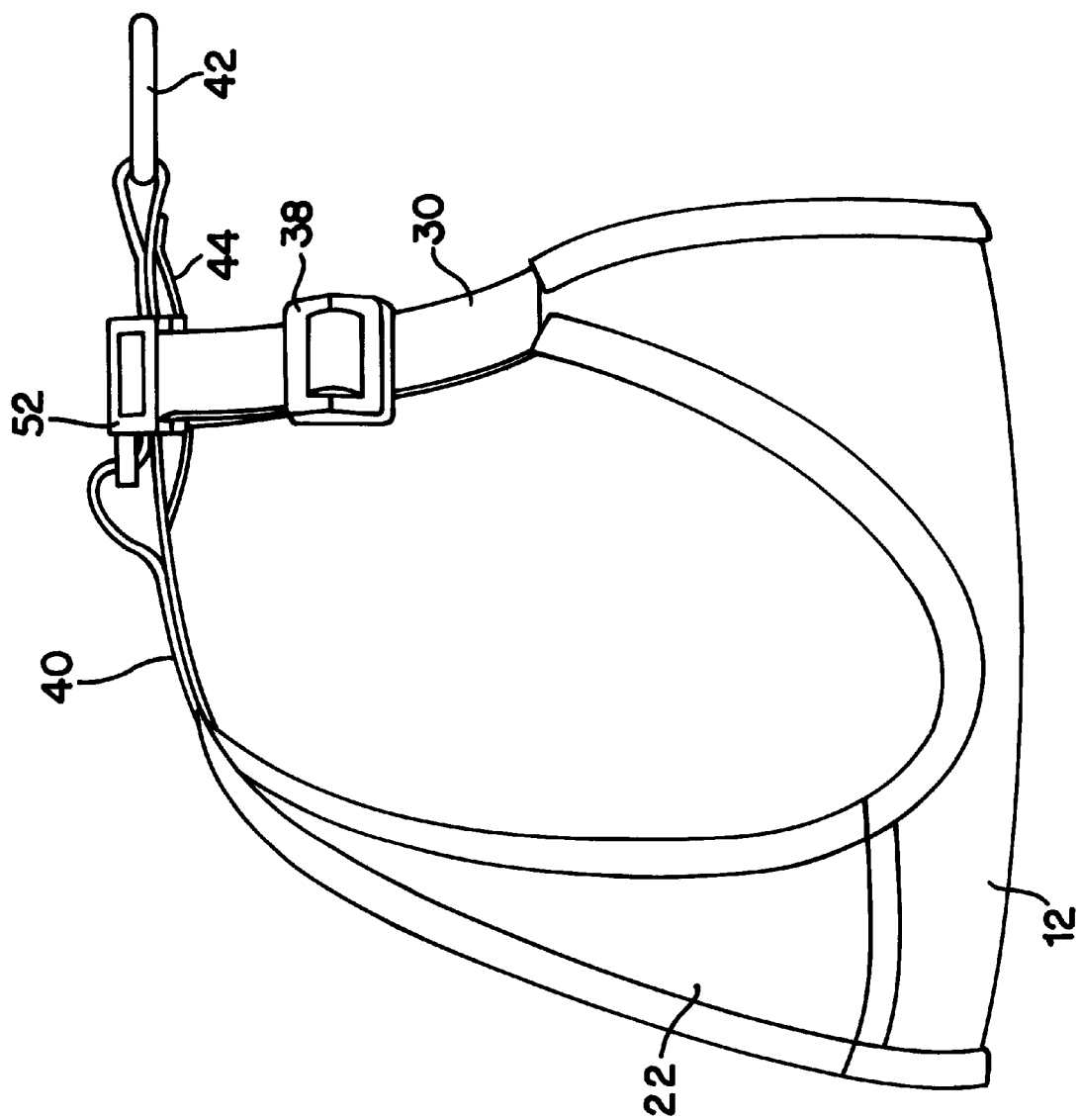
FIG. 5 is a side view of the non-choking pet restraint harness showing details of its construction.
Figure 6:
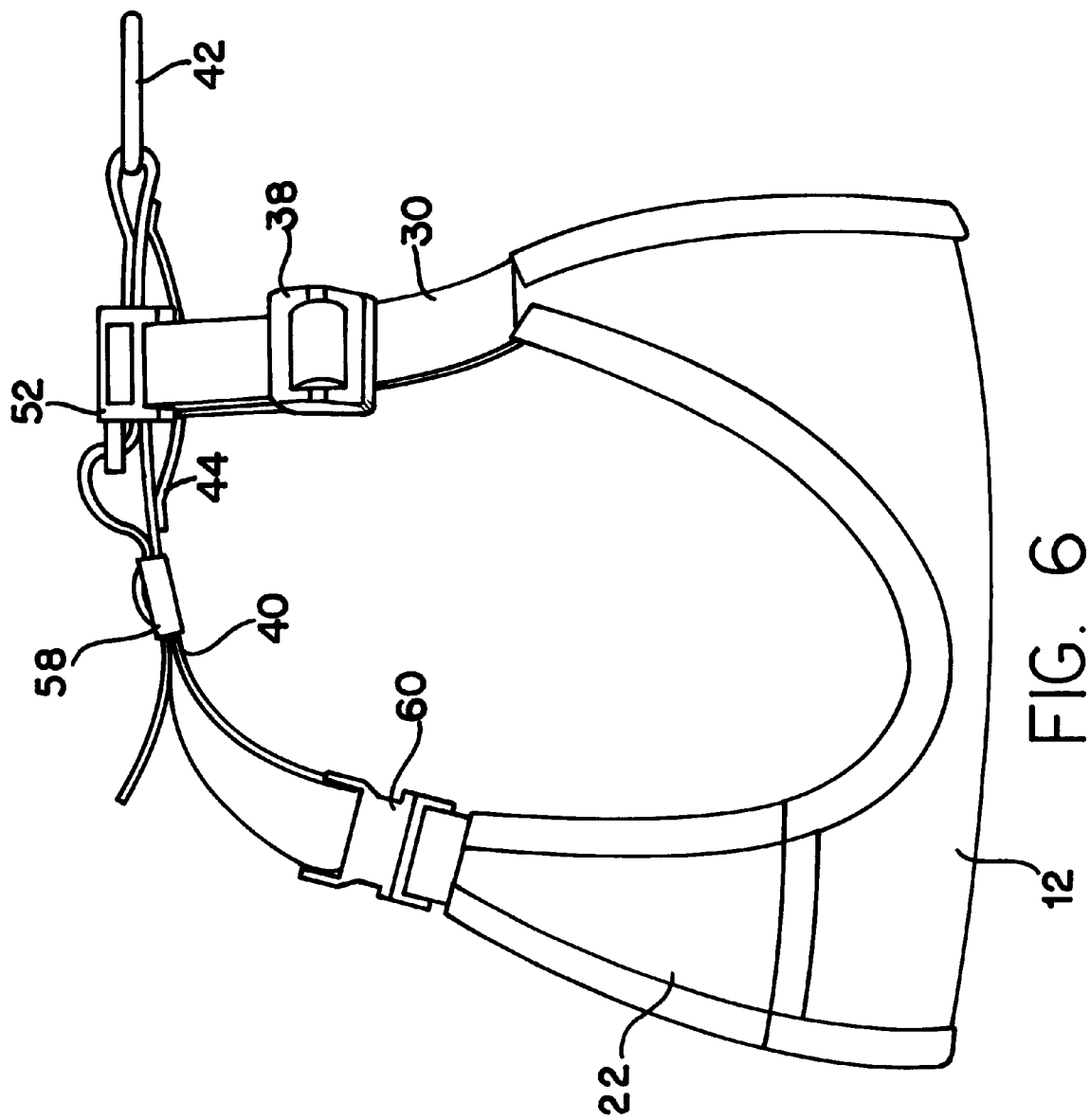
FIG. 6 is a side view of the non-choking pet restraint harness showing an alternative embodiment, which includes additional adjustment straps.

The preferred embodiment of the invention is shown in the figures. FIG. 1 is a perspective view of the device in use, mounted on a medium sized dog. FIG. 2 shows a dog in a seated position with the harness in place. The parts which make up the non-choking pet restraint harness are best seen in FIGS. 4, 5 and 6. The non-choking pet restraint harness 10 is made using a generally triangular shaped chest and belly panel 12, as best seen in FIG. 4. The chest and belly panel 12 has a left rear corner 14, a right rear corner 16, a front end 18, and a rear end 20. In the preferred embodiment, a 1,000 denier urethane coated cordura nylon is utilized. This fabric provides weather resistance and is water resistant. It is strong enough to resist puncture by sticks and rocks encountered in the field, making it substantially field brush proof. It is also lined with a fabric which provides a comfortable lining against the animal's fur. Although this is the preferred shape of the chest and belly panel 12 in the preferred embodiment and the preferred fabric, it should be obvious to one skilled in the art that a number of other shapes of the chest and belly panel would also work, such as a rectangular shape, a strap-like shape, or a trapezoid shape. Similarly, a number of other fabrics could be utilized in its construction, and would still be encompassed by the concept of the invention. Attached to the chest and belly panel 12 at the front end 18 are a left shoulder panel 22 and a right shoulder panel 24. These two panel shapes are mirror images of each other. In the preferred embodiment, the left shoulder panel 22 and the right shoulder panel 24 are generally triangular in shape, although other shapes could also work. They are specifically designed to be fairly wide across the animal's shoulders, so that the force of restraining an animal is transferred to a broad area of the shoulders, rather than to the neck or to any concentrated areas on the animal's body. The shoulder panels 22 and 24 have a first end 26 and a second end 28. They attach to the front end 18 of the belly panel 12 at their first ends 26. At their second ends 28, both shoulder panels 22 and 24 attach to first end 48 of back strap 40. Back strap 40 is preferably flat nylon webbing to which the shoulder panels 22 and 24 are sewn. The manner of their attachment is best shown in FIG. 4. At second end 50 of back strap 40 is attached a restraint attachment ring 42. Restraint attachment ring 42 is preferably a metal D-ring sewn into the flat nylon webbing of back strap 40. Intermediate between the first end of back strap 48 and second end of back strap 50 is located a 3-way buckle 52.

Attached to left rear corner 14 of chest and belly panel 12 is a left flank strap 30. Similarly attached to right rear corner 16 of chest and belly panel 12 is a right flank strap 32. The flank straps 30 and 32 each have a first end 34 and a second end 36, and are attached to the chest and belly panel 12 at their first end 34. At their second end 36, each flank strap 30 and 32 attaches to 3-way buckle 52 by a female buckle part 56 which interconnects with a male buckle part 54, which is on the 3-way buckle 52. Each of the flank straps 30 and 32 also has a flank strap adjustment buckle 38 for adjusting the non-choking pet restraint 10 to fit different sizes of pets.

On the underside of back strap 40 is located a seat belt loop 44, as shown in FIGS. 5 and 6.

A second embodiment of the device is shown in FIG. 6, and includes a back strap adjustment 58 and a shoulder panel adjustment 60.

In use, the flank straps 30 and 32 are disconnected from the 3-way buckle 52, so that the head of a pet, typically a dog, can slip between the left shoulder panel 22 and the right shoulder panel 24 and the chest and belly panel 12. With the device so mounted on a dog's neck, the flank straps 30 and 32 brought up towards the back strap 40, and connected with 3-way buckle 52. Once mounted in this manner, the flank straps 30 and 32 are adjusted using flank strap adjustment buckle 38 in order to take up slack in the straps.

Figure 7:
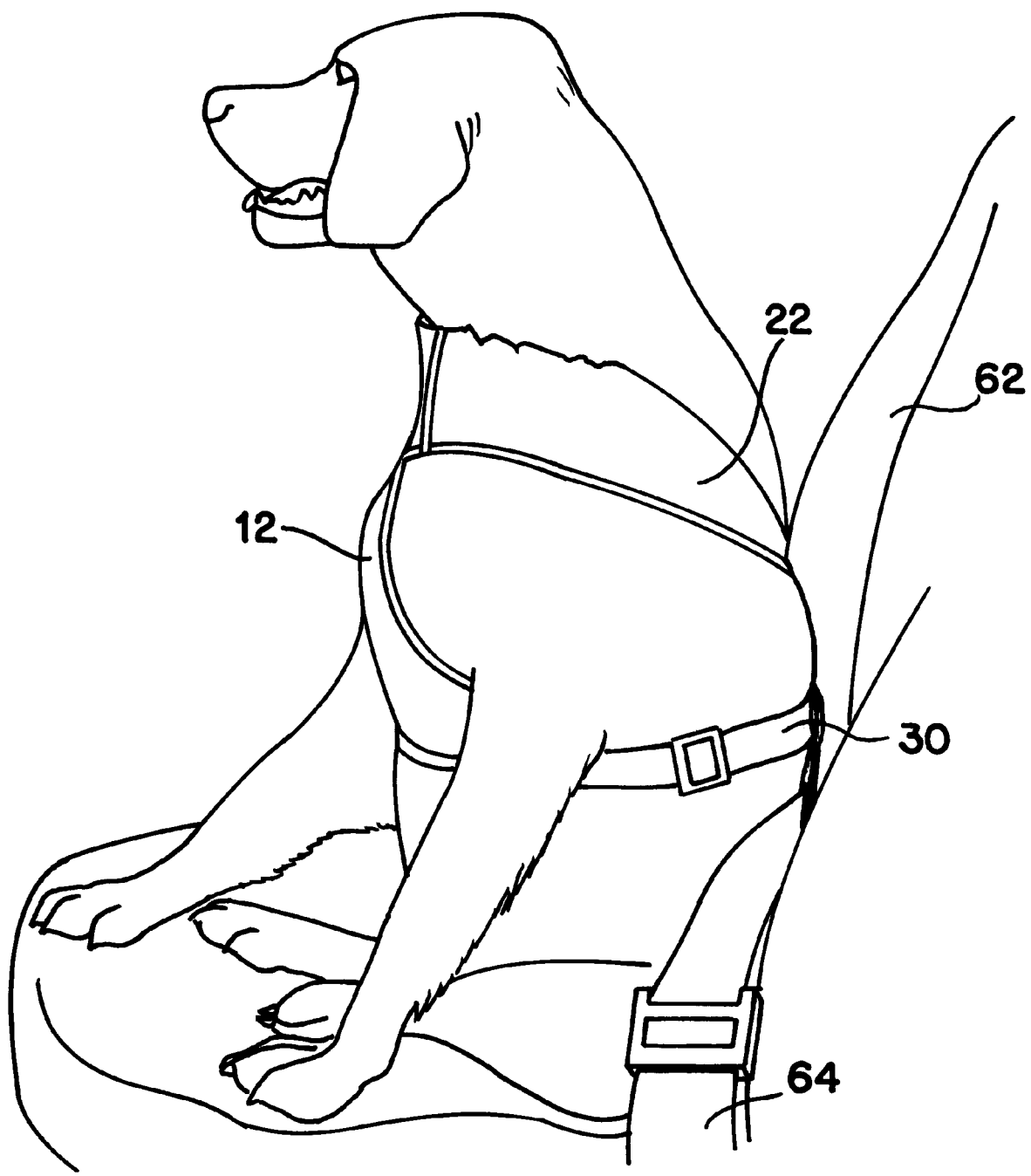
FIG. 7 is a perspective view of the non-choking pet restraint harness attaching a dog to a seat belt, with the dog in a sitting position.
Figure 8:
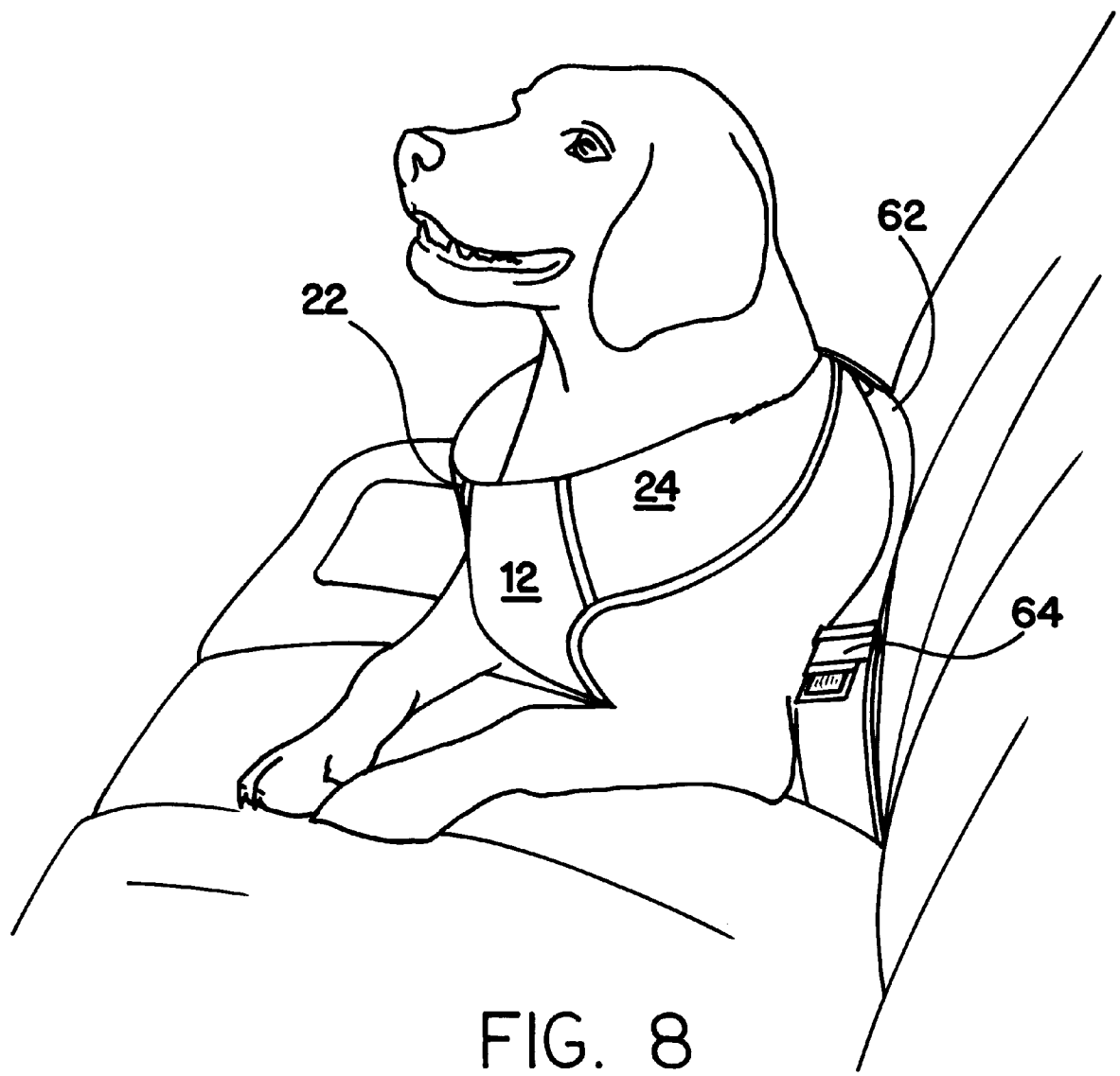
FIG. 8 is a perspective view of the non-choking pet restraint harness attaching a dog to a seat belt, with the dog in a laying down position.

Next, a leash 46 can be attached to the restraint attachment ring 42. Alternatively, if the dog is to be restrained in an automobile, an automobile seat belt 62, as shown in FIGS. 7 and 8, is extended between back strap 40 and seat belt loop 44, and clipped into seat belt receiver 64. In this configuration, the dog may sit as in FIG. 7, or may lie down on an automobile seat as in FIG. 8.

Figure 3:
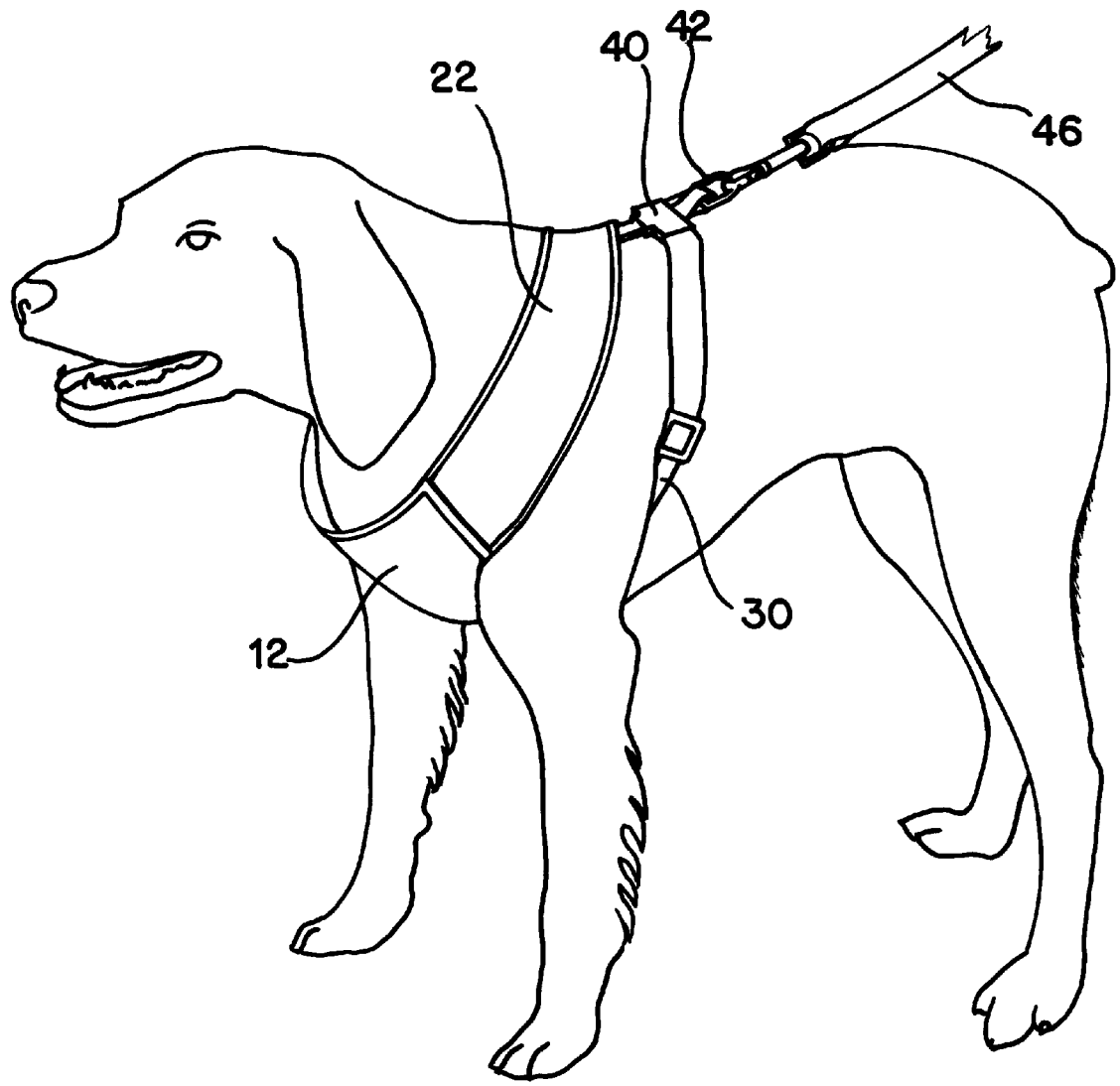
FIG. 3 is a perspective view of the non-choking pet restraint harness on a standing dog with its head down.

The non-choking pet restraint 10 is specifically designed so that when a dog is restrained, pressure is not placed on the dog's neck. Also, the dog may strain against a leash as shown in FIG. 3, and not place strain on his neck. A dog can even pull against his leash, and lower his head to sniff out game, and not have pressure applied to his neck. Instead, the pressure is distributed over the chest and shoulders of the dog. The dog's neck is protected from the application of force by the particular configuration of chest and belly panel 12 as it joins with left shoulder panel 22 and right shoulder panel 24. This configuration is shown in FIGS. 1, 2 and 3.

Another design feature which causes the force of restraining a pet to be placed on the shoulders and chest rather than the neck is the rearward placement on the animal of the point of attachment, the restraint attachment ring 42. The restraint attachment ring 42 is configured to be located well behind the animal's shoulder blades and rib cage, and in front of the animal's hips. When placed in this location, the force of restraining a dog is applied to the animal's shoulders and chest, as shown in FIG. 3, and not to his neck, front leg ligaments, or midsection.

While there is shown and described the present preferred embodiment of the invention, it is to be distinctly understood that this invention is not limited thereto but may be variously embodied to practice within the scope of the following claims.

I claim:

1. A non-choking pet restraint for restraining pets by the use of a leash or restraint strap, and for brush protection, comprising:

chest and belly panel with a front and a rear end, which at said front end attaches to a right and a left shoulder panel, and which at said rear end has a right and left corner, which respectively attach to a right and left flank strap, in which said chest and belly panel covers but does not press on said pet's belly and a lower portion of said pet's neck and throat, and which serves as a field brush protection shield which serves as a shield to substantially resist penetration by field brush;

a right and a left shoulder panel, each of which has a first end and a second end, and which attach at said first end to said front end of said chest and belly panel, and which pass over and which apply pressure on said pet's shoulders and not pet's neck, when pulled from behind, and which attach at said second end to a back strap and which when pulled from behind said pet restrain said pet's forward progress;

an adjustable right and an adjustable left flank strap, each with a first and a second end, which at said first end attach to said right and said left corner of said chest and belly panel, and which at said second end attach to a back strap;

a back strap which has a first end, a second end, and a middle portion, and which at said first end is attached to said right and left shoulder panels, and at said middle portion is attached to said right and left flank straps, and at said second end is attached to a leash attachment ring;

a three way buckle which is attached to back strap, and to which said left and right flank strap each attach and a restraint attachment ring which is attached to said second end of said back strap, and which serves as an attachment point for pet restraint devices and which is configured for positioning behind a ribcage of said pet.

2. The pet restraint of claim 1 in which said left and right shoulder panels are adjustable in length.

3. The pet restraint of claim 1 in which said back strap is adjustable in length, for positioning at least behind a rib cage of said pet.

4. The pet restraint of claim 1 in which said back strap is adjustable in positioning of said three way buckle.

5. The pet restraint of claim 1 in which said restraint ring on said back strap is configured for placement between a rib cage and rear hips of said pet.

6. The pet restraint of claim 1 in which said chest and belly panel is triangular in shape.

7. The pet restraint of claim 1 in which said chest and belly panel is formed from a strap.

8. The pet restraint of claim 1 in which said left and right shoulder panels are triangular in shape.

9. The pet restraint of claim 1 which further includes a loop attached to said back strap for attachment to an automobile seat belt.

10. The pet restraint of claim 1 in which said chest and belly panel covers a majority of a pet's chest, and is substantially resistant to penetration by field brush.

11. A non-choking pet restraint for restraining pets by the use of a leash or other pet restraint, and for brush protection, comprising:

a generally triangular shaped and substantially brushproof chest and belly panel with a front and a rear end, which at said front end attaches to a right and a left shoulder panel, and which at said rear end has a right and left corner, which respectively attach to a right and left flank strap, in which said chest and belly panel covers but does not press on said pet's belly and a lower portion of said pet's neck and throat, and which serves as a field brush protection shield;

a right and a left shoulder panel, each of which has a first end and a second end, and which attach at said first end to said front end of said chest and belly panel, and which pass over and which apply pressure on said pet's shoulders and not pet's neck, when pulled from behind, and which attach at said second end to a right and a left flank strap and which when pulled from behind said pet restrain said pet's forward progress, and which are generally tapering in width from a wider width at said first end, and a narrower width at said second end;

an adjustable right and a left flank strap each with a first and a second end, which at said first end attach to said right and said left corner of said chest and belly panel, and which at said second end attach to a back strap with a three way buckle;

a back strap which has a first end, a second end, and a middle portion, and which at said first end is attached to said right and left shoulder panels, and at said middle portion is attached to said right and left flank straps, and at said second end is attached to a leash attachment ring;

a restraint attachment ring which is attached to said second end of said back strap, and which is configured for placement behind a ribcage of a dog, and which serves as an attachment point for pet restraint devices; and a loop attached to said back strap for attachment to an automobile seat belt.

12. A non-choking pet restraint, for restraining pets by the use of a leash or restraint strap, and for brush protection, comprising:

chest and belly panel with a front and a rear end, which at said front end attaches to a right and a left shoulder panel, and which at said rear end has a right and left corner, which respectively attach to a right and left flank strap, in which said chest and belly panel covers but does not press on said pet's belly and a lower portion of said pet's neck and throat, and which serves as a brush protection shield;

an adjustable right shoulder panel and an adjustable left shoulder panel, which each have a first end and a second end, and which attach at said first end to said front end of said chest and belly panel, and which pass over and which apply pressure on said pet's shoulders and not pet's neck, when pulled from behind, and which attach at said second end to a back strap and which when pulled from behind said pet, restrains said pet's forward progress;

a right and a left adjustable flank strap each with a first and a second end, which at said first end attach to said right and said left corner of said chest and belly panel, and which at said second end attach to a back strap;

an adjustable back strap which has a first, a second end, and a middle portion, for positioning at least behind a rib cage of said pet, and which at said first end is attached to said right and left shoulder panels, and at said middle portion is attached to said right and left flank straps, and at said second end is attached to a leash attachment ring;

a three way buckle which is adjustably attached to said back strap and to which said left and right flank strap attach; and a restraint attachment ring which is attached to said second end of said back strap, and which serves as an attachment point for pet restraint devices and which is configured for positioning behind a ribcage of said pet.

* * * * *